United States Patent
Park et al.

(10) Patent No.: US 12,230,757 B2
(45) Date of Patent: Feb. 18, 2025

(54) ADDITIVE FOR ELECTROLYTE, ELECTROLYTE INCLUDING ADDITIVE, AND LITHIUM SECONDARY BATTERY INCLUDING ELECTROLYTE

(71) Applicant: Samsung SDI Co., Ltd., Yongin-si (KR)

(72) Inventors: Hyejin Park, Yongin-si (KR); Olga Tsay, Yongin-si (KR); Myungheui Woo, Yongin-si (KR); Harim Lee, Yongin-si (KR); Jinhyeok Lim, Yongin-si (KR); Hyunbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 16/801,893

(22) Filed: Feb. 26, 2020

(65) Prior Publication Data

US 2020/0313238 A1     Oct. 1, 2020

(30) Foreign Application Priority Data

Mar. 27, 2019 (KR) ........................ 10-2019-0035121

(51) Int. Cl.
 *H01M 10/0567* (2010.01)
 *C07F 7/10* (2006.01)
 (Continued)

(52) U.S. Cl.
 CPC .......... *H01M 10/0567* (2013.01); *C07F 7/10* (2013.01); *H01M 4/525* (2013.01);
 (Continued)

(58) Field of Classification Search
 None
 See application file for complete search history.

(56) References Cited

U.S. PATENT DOCUMENTS

| 7,358,011 B2 | 4/2008 | Fukuoka et al. |
| 9,735,447 B2 | 8/2017 | Egorov et al. |

(Continued)

FOREIGN PATENT DOCUMENTS

| CN | 101197456 A | 6/2008 |
| CN | 104282940 A | 1/2015 |

(Continued)

OTHER PUBLICATIONS

Buss et al., "Information on Tetrasilyl Substituted Sulfamide and Silyl Substituted Amidosulfonic Acids", 1975, Zeitschrift fuer Naturforschung, Teil B: Anorganische Chemie, Organische Chemie, vol. 30B, Issue: 11-12, pp. 842-846. CAS abstract attached. (Year: 1975).*

(Continued)

*Primary Examiner* — Maria Laios
(74) *Attorney, Agent, or Firm* — Lewis Roca Rothgerber Christie LLP

(57) ABSTRACT

An additive for electrolytes includes a compound represented by Formula 1. The silyl moieties at both ends of the compound may coordinate water to suppress or reduce hydrolysis of $LiPF_6$, and may also form a SEI film capable of improving battery performance. Additional embodiments of the present disclosure provide an electrolyte including the additive; and a lithium secondary battery including the electrolyte.

Formula 1

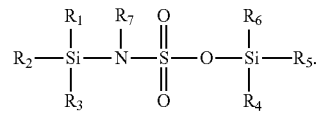

9 Claims, 1 Drawing Sheet

(51) Int. Cl.
   *H01M 4/02*        (2006.01)
   *H01M 4/525*       (2010.01)
   *H01M 10/052*      (2010.01)
   *H01M 10/42*       (2006.01)

(52) U.S. Cl.
   CPC ..... *H01M 10/052* (2013.01); *H01M 10/4235* (2013.01); *H01M 2004/028* (2013.01); *H01M 2220/30* (2013.01); *H01M 2300/0025* (2013.01); *Y02E 60/10* (2013.01)

(56) References Cited

U.S. PATENT DOCUMENTS

| | | |
|---|---|---|
| 2008/0138715 A1 | 6/2008 | Ihara et al. |
| 2015/0010811 A1 | 1/2015 | Egorov et al. |
| 2016/0027592 A1 | 1/2016 | Shimamoto et al. |
| 2016/0233544 A1 | 8/2016 | Kim et al. |
| 2019/0288337 A1 | 9/2019 | Choi et al. |
| 2020/0220215 A1 | 7/2020 | Park et al. |
| 2020/0251781 A1* | 8/2020 | Su .................... H01M 10/0569 |

FOREIGN PATENT DOCUMENTS

| | | | |
|---|---|---|---|
| CN | 105074996 A | | 11/2015 |
| JP | 2000223152 A | * | 8/2000 |
| KR | 10-2004-0047621 A | | 6/2004 |
| KR | 10-2008-0052421 A | | 6/2008 |
| KR | 10-2015-0006364 A | | 1/2015 |
| KR | 10-2015-0139847 A | | 12/2015 |
| KR | 10-2016-0097046 A | | 8/2016 |
| KR | 10-2017-0031636 A | | 3/2017 |
| KR | 10-2018-0075025 A | | 7/2018 |
| KR | 10-2019-0109099 A | | 9/2019 |

OTHER PUBLICATIONS

Machine translation of JP 2000-223152 A (Sano) (Year: 2000).*
KIPO Notice of Allowance dated Jan. 31, 2022, issued in corresponding Korean Patent Application No. 10-2019-0035121, 2 pages.
Chinese First Office action dated Feb. 3, 2024 issued in corresponding CN Application No. 202010211685.X, 7 pages, with English Translation, 8 pages.

* cited by examiner

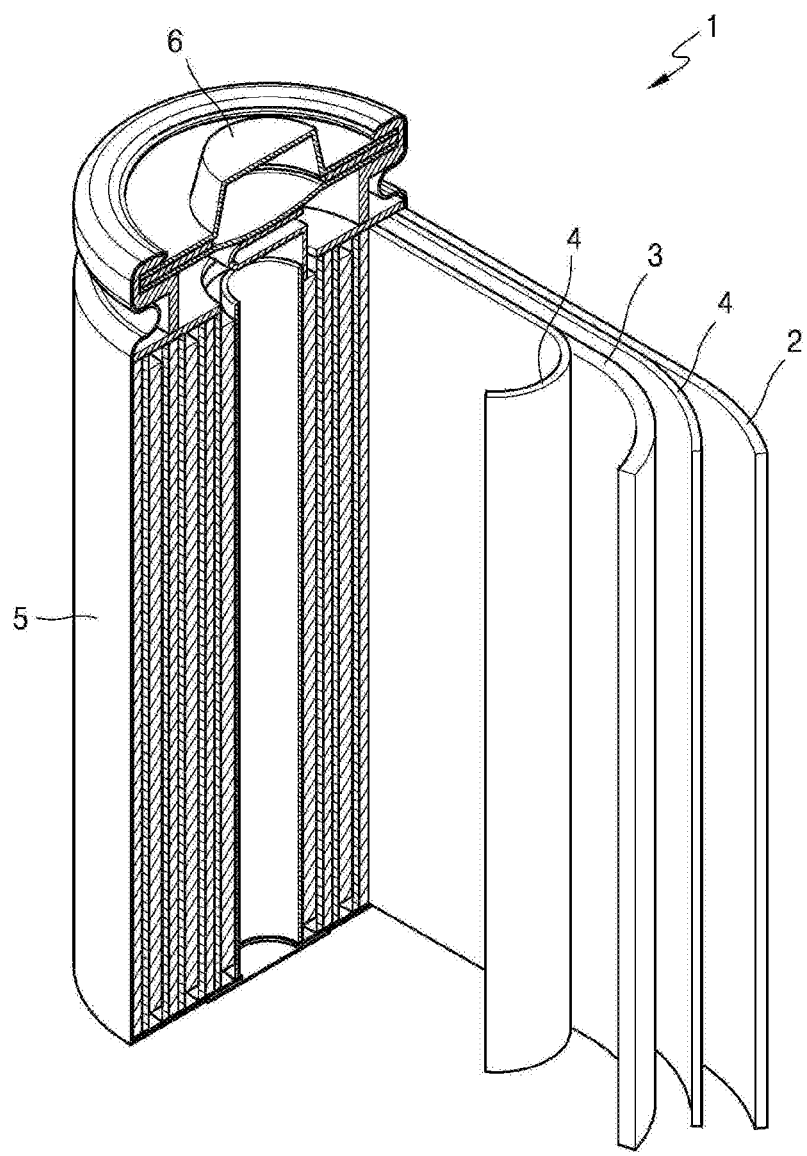

ADDITIVE FOR ELECTROLYTE, ELECTROLYTE INCLUDING ADDITIVE, AND LITHIUM SECONDARY BATTERY INCLUDING ELECTROLYTE

CROSS-REFERENCE TO RELATED APPLICATION

This application claims priority to and the benefit of Korean Patent Application No. 10-2019-0035121, filed on Mar. 27, 2019, in the Korean Intellectual Property Office, the entire content of which is incorporated herein by reference.

BACKGROUND

1. Field

One or more aspects of embodiments of the present disclosure relate to an additive for electrolytes, an electrolyte including the additive, and a lithium secondary battery including the electrolyte.

2. Description of Related Art

Lithium secondary batteries are used as power sources for driving portable electronic appliances such as video cameras, mobile phones, and notebook computers. Rechargeable lithium secondary batteries have three times the energy density per unit weight of comparable lead batteries, nickel-cadmium batteries, nickel metal hydride batteries, and nickel-zinc batteries, and may be charged at higher speeds.

Because lithium secondary batteries are operated at a high driving voltage, they cannot include aqueous electrolytes having high reactivity with lithium. A non-aqueous electrolyte (for example, an organic electrolyte), is generally used in lithium secondary batteries. The organic electrolyte may be prepared by dissolving a lithium salt in an organic solvent. The organic solvent should be stable at a high voltage, and may have high ionic conductivity, a high dielectric constant, and low viscosity.

However, $LiPF_6$, which is the most commonly used lithium salt in non-aqueous electrolytes, has a problem in that it may react with the organic solvent, thereby causing depletion of the solvent and generating a large amount of gas. For example, when $LiPF_6$ decomposes, $LiF$ and $PF_5$- are produced, which causes depletion of the electrolyte in a battery, resulting in the deterioration of high-temperature performance and poor safety.

Accordingly, there is a desire for an electrolyte for lithium secondary batteries that is capable of providing a lithium secondary battery in which side reactions of the aforementioned electrolyte are suppressed, and which has improved lifetime characteristics and high-temperature stability.

SUMMARY

One or more aspects of embodiments of the present disclosure are directed toward a new additive for electrolytes.

One or more aspects of embodiments of the present disclosure are directed toward an electrolyte including the additive.

One or more aspects of embodiments of the present disclosure are directed toward a lithium secondary battery including the electrolyte.

Additional aspects will be set forth in part in the description which follows and, in part, will be apparent from the description, or may be learned by practice of the presented embodiments of the disclosure.

One or more example embodiments of the present disclosure provide an additive for electrolytes, the additive including a compound represented by Formula 1:

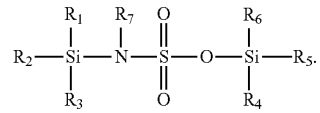

Formula 1

In Formula 1, $R_1$ to $R_6$ are each independently selected from hydrogen, deuterium, halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_3$-$C_{30}$ cycloalkyl group, a substituted or unsubstituted $C_3$-$C_{30}$ heterocycloalkyl group, a substituted or unsubstituted $C_6$-$C_{60}$ aryl group, a substituted or unsubstituted $C_1$-$C_{60}$ heteroaryl group, a substituted or unsubstituted $C_7$-$C_{60}$ aralkyl group, a substituted or unsubstituted $C_6$-$C_{60}$ aryloxy group, and a substituted or unsubstituted $C_6$-$C_{60}$ arylthio group; and $R_7$ is selected from halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_3$-$C_{30}$ cycloalkyl group, a substituted or unsubstituted $C_3$-$C_{30}$ heterocycloalkyl group, a substituted or unsubstituted $C_6$-$C_{60}$ aryl group, a substituted or unsubstituted $C_1$-$C_{60}$ heteroaryl group, a substituted or unsubstituted $C_7$-$C_{60}$ aralkyl group, a substituted or unsubstituted $C_6$-$C_{60}$ aryloxy group, and a substituted or unsubstituted $C_6$-$C_{60}$ arylthio group.

One or more example embodiments of the present disclosure provide an electrolyte, including: a lithium salt; a non-aqueous solvent; and the additive.

One or more example embodiments of the present disclosure provide a lithium secondary battery, including: a cathode; an anode; and the electrolyte.

BRIEF DESCRIPTION OF THE DRAWINGS

The above and other aspects, features, and advantages of certain embodiments of the disclosure will be more apparent from the following description taken in conjunction with the accompanying drawing, in which:

The drawing is a schematic view of a lithium secondary battery according to an embodiment.

DETAILED DESCRIPTION

Reference will now be made in more detail to embodiments, examples of which are illustrated in the accompanying drawings, wherein like reference numerals refer to like elements throughout and redundant descriptions thereof may be omitted. In this regard, the present embodiments may have different forms and should not be construed as being limited to the descriptions set forth herein. Accordingly, the embodiments are merely described below, by referring to the drawing, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the drawings, the diameters, lengths, and thicknesses of various components, layers, and regions may be enlarged or reduced for clarity and ease of description. It is to be understood that when a layer, film, region, plate, or the like is referred to as being "above" or "on" another portion throughout the specification, this includes not only the case where the layer, film, region, plate, or the like is directly above another element, but also the case where there is another portion or element in between. Although the terms first, second, etc. may be used herein to describe various elements, these elements should not be limited by these terms. These terms are only used to distinguish one element from another element. Although some components may be omitted in the drawings, this is to aid in understanding the features of the present disclosure and is not intended to exclude the omitted components.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Further, the use of "may" when describing embodiments of the present disclosure refers to "one or more embodiments of the present disclosure".

As used herein, the term "$C_1$-$C_{30}$ alkyl group" refers to a monovalent linear or branched aliphatic hydrocarbon group including 1 to 30 carbon atoms, and non-limiting examples thereof include a methyl group, an ethyl group, a propyl group, an isopropyl group, a butyl group, an isobutyl group, a tert-butyl group, a pentyl group, and a hexyl group.

As used herein, the term "$C_2$-$C_{30}$ alkenyl group" refers to a monovalent linear or branched aliphatic hydrocarbon group including 2 to 30 carbon atoms including at least one double bond, and non-limiting examples thereof include a vinyl group, an ethenyl group, a propenyl group, and a butenyl group.

As used herein, the term "$C_2$-$C_{30}$ alkynyl group" refers to a monovalent linear or branched aliphatic hydrocarbon group including 2 to 30 carbon atoms including at least one triple bond, and non-limiting examples thereof include an ethynyl group, a propynyl, and a butynyl.

As used herein, the term "$C_1$-$C_{30}$ alkoxy group" refers to a monovalent group represented by —$OA_1$ (here, $A_1$ is a $C_1$-$C_{30}$ alkyl group), and non-limiting examples thereof include a methoxy group, an ethoxy group, and a propoxy group.

As used herein, the term "$C_3$-$C_{30}$ cycloalkyl group" refers to a monovalent cyclic saturated hydrocarbon group including 3 to 30 carbon atoms, and non-limiting examples thereof include a cyclopropyl group, a cyclobutyl group, and a cyclopentyl group.

As used herein, the term "$C_1$-$C_{30}$ heterocycloalkyl group" refers to a monovalent cyclic saturated hydrocarbon group including 1 to 30 carbon atoms and at least one heteroatom, for example, boron (B), nitrogen (N), oxygen (O), and/or sulfur (S), other than carbon, and non-limiting examples thereof include ethylene oxide, trimethylene oxide, and tetrahydrofuran.

As used herein, the term "$C_6$-$C_{60}$ aryl group" refers to a monovalent cyclic aromatic hydrocarbon group including 6 to 60 carbon atoms, and non-limiting examples thereof include ethylene oxide, trimethylene oxide, tetrahydrofuran, anthracene, and pyrene.

As used herein, the term "$C_1$-$C_{60}$ heteroaryl group" refers to a monovalent cyclic aromatic hydrocarbon group including 1 to 60 carbon atoms including at least one heteroatom, for example, B, N, O, or S, other than carbon, and non-limiting examples thereof include pyridine, pyridazine, and phenanthroline.

As used herein, the term "$C_7$-$C_{60}$ aralkyl group" refers to a monovalent group represented by -$A_2$Ar (here, $A_2$ is a $C_1$-$C_{30}$ alkyl group, and Ar is a $C_6$-$C_{60}$ aryl group), and non-limiting examples thereof include a benzyl group.

As used herein, the "$C_6$-$C_{60}$ aryloxy group" refers to —$OA_3$ (here, $A_3$ is a $C_6$-$C_{60}$ aryl group), and the $C_6$-$C_{60}$ arylthio group refers to —$SA_4$ (here, $A_4$ is a $C_6$-$C_{60}$ aryl group).

As used herein, at least one of the substituents of the substituted $C_1$-$C_{30}$ alkyl group, the substituted $C_2$-$C_{30}$ alkenyl group, the substituted $C_2$-$C_{30}$ alkynyl group, the substituted $C_1$-$C_{30}$ alkoxy group, the substituted $C_3$-$C_{30}$ cycloalkyl group, the substituted $C_3$-$C_{30}$ heterocycloalkyl group, the substituted $C_6$-$C_{60}$ aryl group, the substituted $C_1$-$C_{60}$ heteroaryl group, the substituted $C_7$-$C_{60}$ aralkyl group, the substituted $C_6$-$C_{60}$ aryloxy group, and the substituted $C_6$-$C_{60}$ arylthio group is selected from:

deuterium (-D), —F, —Cl, —Br, —I, a $C_1$-$C_{30}$ alkyl group, a $C_2$-$C_{30}$ alkenyl group, a $C_2$-$C_{30}$ alkynyl group, and a $C_1$-$C_{30}$ alkoxy group;

a $C_1$-$C_{30}$ alkyl group, a $C_2$-$C_{30}$ alkenyl group, a $C_2$-$C_{30}$ alkynyl, and a $C_1$-$C_{30}$ alkoxy group, each being substituted with at least one selected from deuterium, —F, —Cl, —Br, —I, a $C_3$-$C_{30}$ cycloalkyl group, a $C_1$-$C_{30}$ heterocycloalkyl group, a $C_6$-$C_{60}$ aryl group, a $C_1$-$C_{60}$ heteroaryl group, a $C_6$-$C_{60}$ aryloxy group, and $C_6$-$C_{60}$ arylthio group;

a $C_3$-$C_{30}$ cycloalkyl group, a $C_1$-$C_{30}$ heterocycloalkyl group, a $C_1$-$C_{60}$ heteroaryl group, a $C_6$-$C_{60}$ aryl group, a $C_6$-$C_{60}$ aryloxy group, and $C_6$-$C_{60}$ arylthio group; and a $C_3$-$C_{30}$ cycloalkyl group, a $C_1$-$C_{30}$ heterocycloalkyl group, a $C_1$-$C_{60}$ heteroaryl group, a $C_6$-$C_{60}$ aryl group, a $C_6$-$C_{60}$ aryloxy group, and $C_6$-$C_{60}$ arylthio group, each being substituted with at least one selected from deuterium, —F, —Cl, —Br, —I, a $C_1$-$C_{30}$ alkyl group, a $C_2$-$C_{30}$ alkenyl group, a $C_2$-$C_{30}$ alkynyl group, a $C_1$-$C_{30}$ alkoxy group, a $C_3$-$C_{30}$ cycloalkyl group, a $C_1$-$C_{30}$ heterocycloalkyl group, a $C_1$-$C_{60}$ heteroaryl group, a $C_6$-$C_{60}$ aryl group, a $C_6$-$C_{60}$ aryloxy group, and $C_6$-$C_{60}$ arylthio group.

Hereinafter, an organic electrolyte and a secondary battery including the organic electrolyte according to embodiments will be described in more detail.

An additive for electrolytes according to an embodiment includes a compound represented by Formula:

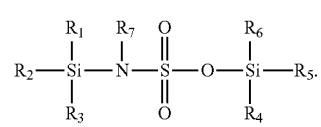

Formula 1

In Formula 1, $R_1$ to $R_6$ may each be independently selected from hydrogen, deuterium, halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_3$-$C_{30}$ cycloalkyl group, a substituted or unsubstituted $C_3$-$C_{30}$ heterocycloalkyl group, a substituted or unsubstituted $C_6$-$C_{60}$ aryl group, a substituted or unsubstituted $C_1$-$C_{60}$ heteroaryl group, a substituted or unsubstituted $C_7$-$C_{60}$ aralkyl group, a substituted or unsubstituted $C_6$-$C_{60}$ aryloxy group, and a substituted or unsubstituted $C_6$-$C_{60}$ arylthio group.

According to an embodiment, $R_1$ to $R_6$ may each be independently selected from:

hydrogen, a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, a n-heptyl group, an iso-heptyl group, a sec-heptyl group, a tert-heptyl group, a n-octyl group, an iso-octyl group, a sec-octyl group, a tert-octyl group, a n-nonyl group, an iso-nonyl group, a sec-nonyl group, a tert-nonyl group, a n-decyl group, an iso-decyl group, a sec-decyl group, a tert-decyl group, an ethylene group, a propylene group, a butylene group, a pentylene group, a hexylene group, a heptylene group, an octylene group, a nonylene group, and a decylene group; and a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, a n-heptyl group, an iso-heptyl group, a sec-heptyl group, a tert-heptyl group, a n-octyl group, an iso-octyl group, a sec-octyl group, a tert-octyl group, a n-nonyl group, an iso-nonyl group, a sec-nonyl group, a tert-nonyl group, a n-decyl group, an iso-decyl group, a sec-decyl group, a tert-decyl group, an ethylene group, a propylene group, a butylene group, a pentylene group, a hexylene group, a heptylene group, an octylene group, a nonylene group, and a decylene group, each being substituted with at least one of deuterium and halogen, but embodiments of the present disclosure is not limited thereto.

For example, $R_1$ to $R_6$ may be each independently selected from:

a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, an ethylene group, a propylene group, a butylene group, a pentylene group, and a hexylene group; and a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, an ethylene group, a propylene group, a butylene group, a pentylene group, and a hexylene group, each being substituted with at least one of deuterium and halogen.

In Formula 1, $R_7$ may be selected from halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_3$-$C_{30}$ cycloalkyl group, a substituted or unsubstituted $C_3$-$C_{30}$ heterocycloalkyl group, a substituted or unsubstituted $C_6$-$C_{60}$ aryl group, a substituted or unsubstituted $C_1$-$C_{60}$ heteroaryl group, a substituted or unsubstituted $C_7$-$C_{60}$ aralkyl group, a substituted or unsubstituted $C_6$-$C_{60}$ aryloxy group, and a substituted or unsubstituted $C_6$-$C_{60}$ arylthio group.

In some embodiments, for example, $R_7$ may be selected from a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, a n-heptyl group, an iso-heptyl group, a sec-heptyl group, a tert-heptyl group, a n-octyl group, an iso-octyl group, a sec-octyl group, a tert-octyl group, a n-nonyl group, an iso-nonyl group, a sec-nonyl group, a tert-nonyl group, a n-decyl group, an iso-decyl group, a sec-decyl group, a tert-decyl group, an ethylene group, a propylene group, a butylene group, a pentylene group, a hexylene group, a heptylene group, an octylene group, a nonylene group, and a decylene group; and a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, a n-heptyl group, an iso-heptyl group, a sec-heptyl group, a tert-heptyl group, a n-octyl group, an iso-octyl group, a sec-octyl group, a tert-octyl group, a n-nonyl group, an iso-nonyl group, a sec-nonyl group, a tert-nonyl group, a n-decyl group, an iso-decyl group, a sec-decyl group, a tert-decyl group, an ethylene group, a propylene group, a butylene group, a pentylene group, a hexylene group, a heptylene group, an octylene group, a nonylene group, and a decylene group, each being substituted with at least one of deuterium and halogen, but embodiments of the present disclosure are not limited thereto.

For example, $R_7$ may be selected from a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, an ethylene group, a propylene group, a butylene group, a pentylene group, and a hexylene group; and a methyl group, an ethyl group, a n-propyl group, an iso-propyl group, a n-butyl group, an iso-butyl group, a sec-butyl group, a tert-butyl group, a n-pentyl group, a tert-pentyl group, a neo-pentyl group, an iso-pentyl group, a sec-pentyl group, a 3-pentyl group, a sec-isopentyl group, a n-hexyl group, an iso-hexyl group, a sec-hexyl group, a tert-hexyl group, an ethylene group, a propylene group, a butylene group, a pentylene group, and a hexylene group, each being substituted with at least one of deuterium and halogen.

In Formula 1 above, $R_1$ to $R_6$ may be identical to or different from each other.

According to an embodiment, $R_1$ to $R_3$ may be identical to each other. According to an embodiment, $R_1$ and $R_3$ may be identical to each other, and $R_1$ and $R_2$ may be different from each other. According to an embodiment, $R_1$ to $R_3$ may be different from each other.

According to an embodiment, $R_4$ to $R_6$ may be identical to each other. According to an embodiment, $R_4$ and $R_6$ may be identical to each other, and $R_4$ and $R_5$ may be different from each other. According to an embodiment, $R_4$ to $R_6$ may be different from each other.

According to an embodiment, $R_1$ to $R_6$ may be identical to each other. According to an embodiment, $R_1$ to $R_6$ may be different from each other.

The compound represented by Formula 1 may be Compound 1:

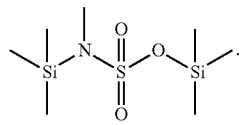

Compound 1

The additive for electrolytes, for example, the additive including the compound represented by Formula 1, may be added to an electrolyte to improve the lifetime characteristics and high-temperature stability of a lithium secondary battery including the electrolyte.

Because the compound represented by Formula 1 above includes silyl moieties having excellent electrical and chemical reactivity at both ends of the molecule, decomposition of an organic solvent in the electrolyte (such as ethylene carbonate (EC)) may be suppressed or reduced, thereby reducing the generation of gas, and lowering the rate of resistance increase.

Further, although $LiPF_6$ is generally used as the lithium salt included in an electrolyte, $LiPF_6$ may have insufficient thermal stability and may be easily hydrolyzed even by trace or residual water. However, when the additive including the compound represented by Formula 1 is added to the electrolyte, the silyl functional groups included in Formula 1 may coordinate water ($H_2O$) molecules, thereby suppressing or reducing hydrolysis of $LiPF_6$ by water. As a result, the generation of gas in the lithium secondary battery may be suppressed or reduced to improve cycle lifetime characteristics. Further, swelling of the battery due to gas generation may also be prevented or reduced.

In some embodiments, for example, the silyl moieties located at the ends of Formula 1 may form a stable thin film on the surface of a metal substrate (such as an electrode substrate or current collector) through a complexing reaction with metal ions, for example, by forming an organometallic complex with copper ions ($Cu^{2+}$) eluted from the metal substrate. Due to the formation of such a thin film, additional elution of metal from the metal substrate may be suppressed, and thus overdischarging (e.g., unwanted discharging) of a battery during battery storage may be suppressed to improve battery characteristics.

During initial charging of the lithium secondary battery, one or more decomposition reactions of the electrolyte may occur on the surface of the battery anode. The reason for this is that the reduction potential of the electrolyte is higher than that of lithium. The decomposition reactions of the electrolyte may form (e.g., result in formation of) a solid electrolyte interphase (SEI) layer on the surface of an electrode to thereby suppress or reduce additional movement of electrons required for a reaction between an anode and an electrolyte, thereby preventing or reducing additional decomposition of the electrolyte. Thus, the performance of a battery is affected by the characteristics of a film (e.g., the SEI layer) formed on the surface of the anode. Considering this, it is desired to form an SEI layer that is more rigid and has excellent electrical characteristics, for example, through the introduction of an electrolyte additive that is decomposed before (e.g., in place of) the electrolyte during charging.

The additive for electrolytes according to an embodiment, as, represented by Formula 1, may include silyl moieties having excellent electrochemical reactivity during charging at both ends of the molecule, and thus the additive may be decomposed before the electrolyte, thereby forming an SEI film that is rigid and has excellent electrical characteristics on the surface of an anode.

Further, the additive for electrolytes, represented by Formula 1, may include silyl moieties at both ends of the molecule, and thus an SEI film having a high silyl moiety concentration may be formed, thereby forming a chemically stable film having high polarity. Accordingly, the resistance at the interface between an electrolyte and an anode may be lowered to improve the conductivity of lithium ions, and thus a low-temperature discharge voltage may be increased.

Further, because the silyl moiety has excellent electrochemical reactivity, the silyl moiety may form a donor-acceptor bond with a transition metal oxide exposed at the surface of a cathode active material, and thus a protective layer may be formed in the form of a composite.

Further, because the silyl moiety attached to a transition metal oxide may be oxidized during initial charging of the lithium secondary battery, consequently, an inactive layer that is more stable and more ionically conductive may be formed by the silyl moiety on a cathode. Accordingly, it is possible to prevent or reduce other components of the electrolyte from being oxidatively decomposed (e.g., at the cathode), and consequently, it is possible to improve the cycle lifetime performance of the lithium secondary battery and prevent or reduce the occurrence of a swelling phenomenon.

Because one of the silyl moieties of the additive for electrolytes, represented by Formula 1 above, is connected to a sulfone group by an alkyl-amine group, the additive may have increased stability in solvent due to bonding between the silyl moiety and an amine group (for example, because of the increased bond strength of the Si—N bond) due to the electron donor characteristics of the alkyl group, as compared with a case where the additive is connected to the sulfone group by an unsubstituted amine group.

Further, the high-temperature stability of the additive for electrolytes, represented by Formula 1 above, may be improved, and thus decomposition of a carbonate-based solvent may be suppressed or reduced along with increases in battery resistance, as compared with a case where the silyl moieties at both ends of the additive are connected to a sulfone group through an "—O—" bond (moiety).

An electrolyte according to an embodiment may include a lithium salt; a non-aqueous organic solvent; and the additive.

According to an embodiment, the content of the additive may be about 0.1 parts by weight to about 5 parts by weight based on 100 parts by weight of the electrolyte. For example, the content of the additive may be about 0.5 parts by weight to about 5 parts by weight based on 100 parts by weight of the electrolyte.

When the content of the additive exceeds 5 parts by weight based on the total weight of the electrolyte, the additive may act as a resistor, so that the lifetime of the battery is deteriorated due to an increase in interfacial resistance, and overall battery resistance. In contrast, when the content of the additive is less than 0.1 parts by weight, high-temperature storage characteristics may be deteriorated.

According to an embodiment, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)(2 \leq x \leq 20, 2 \leq y \leq 20)$, LiCl, LiI, lithium bis(oxalate) borate (LiBOB), and $LiPO_2F_2$, but is not limited thereto. Any lithium salt may be used as long as it is used in the related technical field.

The concentration of the lithium salt in the electrolyte may be about 0.01 M to about 2.0 M, but is not limited to this range. Any appropriate or suitable concentration may be used. Within the above concentration range, further improved battery characteristics may be obtained.

According to an embodiment, the non-aqueous solvent serves as a medium through which lithium ions can move during the charge and discharge of a lithium secondary battery. The non-aqueous solvent may include at least one of a carbonate-based solvent, an ester-based solvent, an ether-based solvent, a ketone-based solvent, or an aprotic solvent.

The carbonate-based solvent includes a linear carbonate-based solvent or a cyclic carbonate-based solvent. Non-limiting examples of the linear carbonate-based solvent include dimethyl carbonate (DMC), diethyl carbonate (DEC), ethylmethyl carbonate (EMC), dipropyl carbonate (DPC), methylpropyl carbonate (MPC), and ethylpropyl carbonate (EPC). Non-limiting examples of the cyclic carbonate-based solvent include ethylene carbonate (EC), propylene carbonate (PC), and butylene carbonate (BC).

Non-limiting examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone.

Non-limiting examples of the ether-based solvent include dibutyl ether, tetraglyme, diglyme, dimethoxyethane, 2-methyltetrahydrofuran, tetrahydrofuran, and tetraethylene glycol dimethyl ether (TEGDME).

A non-limiting example of the ketone-based solvent includes cyclohexanone.

Non-limiting examples of the aprotic solvent include dimethylformamide and 1,3-dioxolane.

The non-aqueous solvent may include a mixture of a linear carbonate-based solvent and a cyclic carbonate-based solvent. According to an embodiment, the mixing volume ratio of the mixture of the linear carbonate-based solvent and the cyclic carbonate-based solvent may be about 1:1 to about 9:1, but is not limited thereto. The linear carbonate-based solvent and the cyclic carbonate-based solvent may be appropriately or suitably mixed at a ratio at which the performance of an electrolyte does not deteriorate.

The electrolyte may be in a liquid or gel state. The electrolyte may be prepared by adding the lithium salt and the additive to the organic solvent.

A lithium secondary battery according to another embodiment includes a cathode; an anode; and the above electrolyte. The form of the lithium secondary battery is not particularly limited, and may include a lithium secondary battery such as a lithium ion battery, a lithium ion polymer battery, and a lithium sulfur battery, as well as a lithium primary battery.

The operating voltage of the lithium secondary battery may be 4.2 V or more, for example, 4.3 V or more, for example, 4.45 V or more.

For example, the lithium secondary battery may be manufactured by the following method.

First, a cathode is prepared.

For example, a cathode active material composition in which a cathode active material, a conductive material, a binder, and a solvent are mixed is prepared. A cathode plate is prepared by coating a cathode current collector with the cathode active material composition. In some embodiments, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation as long as it is generally used in the art. As the lithium-containing metal oxide, for example, two or more kinds of composite oxides of lithium and a metal selected from cobalt, manganese, nickel, and combinations thereof may be used. For example, the lithium-containing metal oxide may be a compound represented by any one of Formulae of $Li_aA_{1-b}B^1{}_bD^1{}_2$ (where $0.90 \leq a \leq 1.8$ and $0 \leq b \leq 0.5$ are satisfied); $Li_aE_{1-b}B^1{}_bO_{2-c}D^1{}_c$ (where $0.90 \leq a \leq 1.8$, $0 \leq b \leq 0.5$, and $0 \leq c \leq 0.05$ are satisfied); $LiE_{2-b}B^1{}_bO_{4-c}D^1{}_c$ (where 0 b 0.5 and 0≤c 0.05 are satisfied); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cdO_{2-\alpha}F^1{}_2$ (where $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dGeO_2$ (where $0.90 \leq a \leq 1.8$, $0 \leq b \leq 0.9$, $0 \leq c$ 0.5, $0 \leq d \leq 0.5$, and $0.001 \leq e \leq 0.1$ are satisfied); $Li_aNiG_bO_2$ (where $0.90 \leq a \leq 1.8$ and $0.001 \leq b \leq 0.1$ are satisfied); $Li_aCoG_bO_2$ (where $0.90 \leq a \leq 1.8$ and $0.001 \leq b \leq 0.1$ are satisfied); $Li_aMnG_bO_2$ (where $0.90 \leq a \leq 1.8$ and $0.001 \leq b \leq 0.1$ are satisfied); $Li_aMn_2GbO_4$ (where $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Formulae above, A is nickel (Ni), cobalt (Co), manganese (Mn), or a combination thereof; $B^1$ is aluminum (Al), Ni, Co, Mn, chromium (Cr), iron (Fe), magnesium (Mg), strontium (Sr), vanadium (V), a rare earth element, or a combination thereof; $D^1$ is oxygen (O), fluorine (F), sulfur (S), phosphorus (P), or a combination thereof; E is Co, Mn, or a combination thereof; $F^1$ is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; $I^1$ is Cr, V, Fe, scandium (Sc), yttrium (Y), or a combination thereof; and J is V, Cr, Mn, Co, Ni, Cu, or a combination thereof.

For example, the lithium-containing metal oxide may be $LiCoO_2$, $LiMn_gO_{2g}$ (g=1, 2), $LiNi_{1-g}Mn_gO_{2g}$ ($0<g<1$), $LiNi_{1-g-k}Co_gMnkO_2$ ($0 \leq g \leq 0.5$, $0 \leq k \leq 0.5$), or $LiFePO_4$.

For example the cathode may include a cathode active material with a layered structure.

According to an embodiment, the cathode may include a nickel-based cathode active material.

In some embodiments, for example, the cathode active material may be represented by Formula 3:

$$LiNi_{1-s}M'_sO_2.$$ Formula 3 in Formula 3, M' is at least one selected from Co, Mn, Al, Cu, Fe, Mg, Cr, zinc (Zn), boron (B), and gallium (Ga), and $0<s\leq0.99$ is satisfied.

In some embodiments, for example, the cathode active material may be represented by Formula 4:

$$Li_t(Ni_{1-u-v}Co_uM''_v)O_2.$$ Formula 4 in Formula 4, M" is Mn or Al, and $0.96\leq t\leq 1.05$, $0<u\leq 0.5$, and $0<v\leq 0.5$) are satisfied. For example, in Formula 4, $0.01\leq u\leq 0.35$ may be satisfied. For example, in Formula 4, $0.01\leq v\leq 0.35$ may be satisfied.

For example, the cathode active material may be $LiNi_{0.33}Co_{0.33}Mn_{0.33}O_2$, $LiNi_{0.33}Co_{0.33}Al_{0.33}O_2$, $LiNi_{0.6}Co_{0.2}Mn_{0.2}O_2$, $LiNi_{0.6}Co_{0.2}Al_{0.202}$, $LiNi_{0.8}Co_{0.1}Mn_{0.1}O_2$, or $LiNi_{0.8}Co_{0.1}Al_{0.1}O_2$, but embodiments of the present disclosure are not limited thereto.

In one or more embodiments, a compound having a coating layer on its surface may be used, or a mixture of the compound (e.g., an uncoated compound) and a second compound having a coating layer on its surface may be used. The coating layer may include a coating element compound such as an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), B, arsenic (As), zirconium (Zr), or a mixture thereof. In the process of forming the coating layer, any suitable coating method may be used as long as the method does not adversely affect the physical properties of the cathode active material (for example, spray coating, dipping or the like). The coating method may be a coating method available to and understood by those skilled in the art.

The conductive material may be or include carbon black and/or graphite particles, but is not limited thereto. Any conductive material may be used as long as it is used in the related technical field.

Non-limiting examples of the binder may include a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. Any binder may be used as long as it is used in the related technical field.

As the solvent, N-methylpyrrolidone, acetone, water, and/or the like may be used, but the present disclosure is not limited thereto. Any solvent may be used as long as it is used in the related technical field.

Any suitable amounts of the cathode active material, the conductive material, the binder, and the solvent are levels may be included or used in the lithium secondary battery. In some embodiments, one or more of the conductive material, the binder, and the solvent may be omitted according to the intended use and configuration of the lithium secondary battery.

Next, an anode is prepared.

For example, an anode active material composition in which an anode active material, a conductive material, a binder, and a solvent are mixed is prepared. An anode plate is prepared by directly coating an anode current collector with the anode active material composition and drying the anode active material composition. In some embodiments the anode plate may be prepared by casting the anode active material composition onto a separate support, separating a film from the support, and then laminating the separated film on a metal current collector.

The anode active material may be used without limitation. Any suitable anode active material may be used as long as it is used in the related technical field. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, lead (Pb), bismuth (Bi), antimony (Sb), a Si—Y alloy (Y is an alkaline metal, an alkaline earth metal, a group 13 element, a group 14 element excluding Si, a transition metal, or a combination thereof), or a Sn—Y alloy (Y is an alkaline metal, an alkaline earth metal, a group 13 element, a group 14 element excluding Sn, a transition metal, or a combination thereof). The element Y may be magnesium (Mg), calcium (Ca), strontium (Sr), barium (Ba), radium (Ra), Sc, Y, Ti, zirconium (Zr), hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, rutherfordium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, indium (In), Ti, Ge, P, As, Sb, Bi, S, selenium (Se), or tellurium (Te).

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbon-based material may be crystalline carbon, amorphous carbon, or a mixture thereof. The crystalline carbon may be graphite such as natural graphite and/or artificial graphite, each having an amorphous (e.g., no particular shape), plate-like, flake-like, spherical, or fibrous form. The amorphous carbon may be soft carbon (low-temperature fired carbon), hard carbon, mesophase pitch carbide, and/or fired coke.

The conductive material, binder, and solvent in the anode active material composition may be the same as those in the cathode active material composition.

Any suitable amounts of the anode active material, the conductive material, the binder, and the solvent may be used in the lithium secondary battery. In some embodiments, one or more of the conductive material, the binder, and the solvent may be omitted depending on the use and configuration of the lithium secondary battery.

Next, a separator to be inserted between the anode and the cathode is prepared.

Any suitable separator may be used as long as it is commonly used in a lithium battery. A separator having low resistance to the movement of ions in the electrolyte and superior in electrolyte wettability may be used. For example, the separator may be formed of or include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium ion battery, and a separator having good electrolyte impregnation ability may be used in a lithium ion polymer battery. As an example, the separator may be produced by the following method.

A polymer resin, a filler, and a solvent are mixed to prepare a separator composition. The separator composition is directly applied on an electrode and dried to form a separator. In some embodiments, the separator composition is cast on a support and dried, a separation film is separated from the support, and then the separation film is laminated on the electrode to form a separator.

The polymer resin used in the production of the separator is not limited, and any suitable material may be used as long as it may be used in a binder of an electrode plate. For example, the polymer resin may be or include a vinylidene fluoride/hexafluoropropylene copolymer, polyvinylidene fluoride (PVDF), polyacrylonitrile, polymethyl methacrylate, or a mixture thereof.

Next, the above-described electrolyte for a lithium secondary battery is prepared.

As shown in the drawing, the lithium secondary battery 1 includes a cathode 2, an anode 3, and a separator 4. The anode 3, the cathode 2, and the separator 4 are wound or folded and accommodated in a battery case 5. Then, an electrolyte is injected into the battery case 5, and the battery case 5 is sealed with a cap assembly 6 to complete the manufacture of the lithium secondary battery 1. The battery case 5 may have a cylindrical shape, a rectangular shape, or a thin film shape. For example, the lithium secondary battery 1 may be a large-sized thin-film battery. The lithium secondary battery 1 may be a lithium ion battery.

The separator 4 may be located between the anode 3 and the cathode 2 to form a battery structure. The battery structure is laminated as a bi-cell structure and then impregnated with an electrolyte, and the resulting product is accommodated in a pouch and sealed to complete a lithium ion polymer battery.

Further, a plurality of battery structures may be laminated to form a battery pack, and this battery pack may be used in appliances requiring high capacity and high power. For example, the battery pack may be used in notebooks, smart phones, electric vehicles, and the like.

Further, because the lithium secondary battery has excellent lifetime characteristics and high rate characteristics, it may be used in electric vehicles (EV). For example, the lithium secondary battery may be used in hybrid vehicles such as plug-in hybrid electric vehicles. Further, the lithium secondary battery may be used in fields requiring a large amount of electric power storage. For example, the lithium secondary battery may be used in electric bicycles, electric tools, and the like.

Hereinafter, the present disclosure will be described in more detail with reference to Examples and Comparative Examples. However, these Examples are for illustrating the present disclosure, and the scope of the present disclosure is not limited thereto.

Preparation of Electrolyte

Synthesis Example

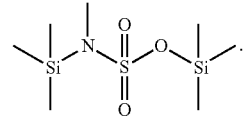

Compound 1

Trimethylsilyl chlorosulfonate (18.11 g, 0.09 mol) was added dropwise to heptamethyldisilazane (17.54 g, 0.1 mol) diluted with dichloromethane (60 mL), and then stirred at room temperature for 3 hours. Then, distillation under high pressure was performed to obtain a transparent liquid (20.5 g, yield=83%).

$^1$H-NMR (400 MHz, CDCl$_3$): 0.25 (m, 9H), 0.32 (m, 9H), 2.74 (m, 3H).

Preparation Example 1

1.5 M LiPF$_6$ was added to a mixed solvent of ethylene carbonate (EC) and ethyl methyl carbonate (EMC) at a volume ratio of 3:7 to prepare a mixed solution.

0.1 wt % of Compound 1 above was added to the mixed solution to prepare an electrolyte for a lithium secondary battery.

Preparation Example 2

An electrolyte for a lithium secondary battery was prepared in substantially the same manner as in Preparation Example 1, except that 0.5 wt % of Compound 1 was added.

Preparation Example 3

An electrolyte for a lithium secondary battery was prepared in substantially the same manner as in Preparation Example 1, except that 1 wt % the Compound 1 was added.

Preparation Example 4

An electrolyte for a lithium secondary battery was prepared in substantially the same manner as in Preparation Example 1, except that 3 wt % of Compound 1 was added.

Preparation Example 5

An electrolyte for a lithium secondary battery was prepared in substantially the same manner as in Preparation Example 1, except that 5 wt % of Compound 1 was added.

Comparative Preparation Example 1

An electrolyte for a lithium secondary battery was prepared in substantially the same manner as in Preparation Example 1, except that Compound 1 was not added.

Comparative Preparation Example 2

An electrolyte for a lithium secondary battery was prepared in substantially the same manner as in Preparation Example 1, except that 1 wt % of Comparative Compound 1 below was added instead of Compound 1.

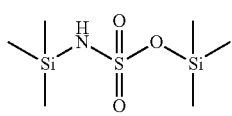

Comparative Compound 1

Comparative Preparation Example 3

An electrolyte for a lithium secondary battery was prepared in the same manner as in Preparation Example 1, except that 1 wt % of Comparative Compound 2 was added instead of Compound 1.

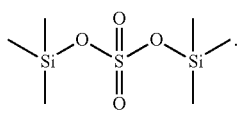

Comparative Compound 2

Manufacture of Lithium Secondary Battery

Example 1

98 wt % of artificial graphite (BSG-L, Tianjin BTR New Energy Technology Co., Ltd.), 1.0 wt % of styrene-butadiene rubber (SBR) binder (ZEON), and 1.0 wt % of carboxymethyl cellulose (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

Preparation of Cathode 97.45 wt % of $LiNi_{0.33}Co_{0.33}Mn_{0.33}O_2$), 0.5 wt % of artificial graphite (SFG6, Timcal) powder, 0.7 wt % of carbon black (Ketjenblack, ECP), 0.25 wt % of modified acrylonitrile rubber (BM-720H, manufactured by Zeon Corporation), 0.9 wt % of polyvinylidene fluoride (PVdF, S6020, Solvay), and 0.2 wt % of polyvinylidene fluoride (PVdF, S5130, Solvay) were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured using a polyethylene separator having a thickness of 14 μm and coated with ceramic on the anode side, and using the electrolyte prepared in Preparation Example 1.

Example 2

A lithium secondary battery was manufactured in substantially the same manner as in Example 1, except that the electrolyte prepared in Preparation Example 2 was used instead of the electrolyte prepared in Preparation Example 1.

Example 3

A lithium secondary battery was manufactured in substantially the same manner as in Example 1, except that the electrolyte prepared in Preparation Example 3 was used instead of the electrolyte prepared in Preparation Example 1.

Example 4

A lithium secondary battery was manufactured in substantially the same manner as in Example 1, except that the electrolyte prepared in Preparation Example 4 was used instead of the electrolyte prepared in Preparation Example 1.

Example 5

A lithium secondary battery was manufactured in substantially the same manner as in Example 1, except that the electrolyte prepared in Preparation Example 5 was used instead of the electrolyte prepared in Preparation Example 1.

Comparative Example 1

A lithium secondary battery was manufactured in substantially the same manner as in Example 1, except that the electrolyte prepared in Comparative Preparation Example 1 was used instead of the electrolyte prepared in Preparation Example 1.

Comparative Example 2

A lithium secondary battery was manufactured in substantially the same manner as in Example 1, except that the electrolyte prepared in Comparative Preparation Example 2 was used instead of the electrolyte prepared in Preparation Example 1.

Comparative Example 3

A lithium secondary battery was manufactured in substantially the same manner as in Example 1, except that the electrolyte prepared in Comparative Preparation Example 3 was used instead of the electrolyte prepared in Preparation Example 1.

Evaluation Example 1: Resistance Test after Storing at the High-Temperature (at 60° C. for 30 Days)

The resistances (DC-IR) of the lithium secondary batteries manufactured in Examples 1 to 5 and Comparative Examples 1 to 3 were measured on the first day at which the batteries were stored at high temperature (60° C.), and measured again after 30 days of storage. Then, resistance increase rates (%) were calculated. The results thereof are given in Table 1.

TABLE 1

|  | Initial DC-IR (mΩ) | DC-IR (mΩ) after 30 days | DC-IR increase rate (%) |
|---|---|---|---|
| Example 1 | 40.5 | 52.8 | 130 |
| Example 2 | 40.9 | 48.6 | 119 |
| Example 3 | 41.2 | 46.8 | 113 |

TABLE 1-continued

| | Initial DC-IR (mΩ) | DC-IR (mΩ) after 30 days | DC-IR increase rate (%) |
|---|---|---|---|
| Example 4 | 44.8 | 49.0 | 109 |
| Example 5 | 45.2 | 49.0 | 108 |
| Comparative Example 1 | 41.5 | 54.7 | 132 |
| Comparative Example 2 | 41.2 | 55.0 | 133 |
| Comparative Example 3 | 40.9 | 58.2 | 142 |

As shown in Table 1, it is found that the high-temperature resistance increase rates of each of the lithium secondary batteries of Examples 1 to 5 were remarkably lower than that of each of the lithium secondary battery of Comparative Example 1 (which did not include Compound 1), the lithium secondary battery of Comparative Example 2 (which included Comparative Compound 1 different from Compound 1 in structure), and the lithium secondary battery of Comparative Example 3 (including Comparative Compound 2 different from Compound 1 in structure), even when they were stored at high temperature for a long period of time. Without being bound by the correctness of any theory or explanation, it is believed that because a silyl group and a sulfone group are connected by —NH— in Comparative Example 2 including Comparative Compound 1, the solvent stabilizing effect is reduced, and thus cell resistance characteristics after high-temperature storage are not improved. Further, it is believed that, in Comparative Example 3 including Comparative Compound 2, because a silyl group and a sulfone group are connected by —O—, the molecule is more easily decomposed during high-temperature storage along with the non-aqueous solvent, for example, a carbonate-based solvent, and thus the resistance of the battery is rapidly increased.

According to an embodiment, when a lithium secondary battery using an electrolyte including the additive according to embodiments of the present disclosure is used, the resistance increase of the lithium secondary battery during high-temperature storage is remarkably suppressed by the additive, and thus the high-temperature characteristics of the lithium secondary battery are improved.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope as defined by the following claims and equivalents thereof.

What is claimed is:

1. An electrolyte for a lithium secondary battery, the electrolyte comprising:
   a lithium salt;
   a non-aqueous solvent; and
   an additive comprising a compound represented by Formula 1:

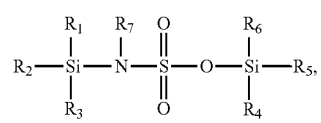

Formula 1 wherein in Formula 1,
$R_1$ to $R_6$ are each independently selected from:
  a methyl group, an ethyl group, an n-propyl group, an iso-propyl group, an n-butyl group, an iso-butyl group, a sec-butyl group, and a tert-butyl group; and
  a methyl group, an ethyl group, an n-propyl group, an iso-propyl group, an n-butyl group, an iso-butyl group, a sec-butyl group, and a tert-butyl group, each being substituted with at least one selected from deuterium and a halogen,
$R_7$ is selected from:
  a methyl group, an ethyl group, an n-propyl group, an iso-propyl group, an n-butyl group, an iso-butyl group, a sec-butyl group, and a tert-butyl group, each being substituted with at least one deuterium,
wherein the additive is included at about 0.5 parts by weight to about 5 parts by weight based on 100 parts by weight of the electrolyte.

2. The electrolyte for a lithium secondary battery of claim 1, wherein $R_1$ to $R_3$ are identical to each other.

3. The electrolyte for a lithium secondary battery of claim 1, wherein $R_4$ to $R_6$ are identical to each other.

4. The electrolyte for a lithium secondary battery of claim 1, wherein $R_1$ to $R_6$ are identical to each other.

5. A lithium secondary battery comprising:
   a cathode;
   an anode; and
   the electrolyte for a lithium secondary battery of claim 1 between the cathode and the anode.

6. The lithium secondary battery of claim 5, wherein the cathode comprises a nickel-based cathode active material.

7. An electrolyte for a lithium secondary battery, the electrolyte comprising:
   a lithium salt;
   a non-aqueous solvent; and
   an additive comprising Compound 1:

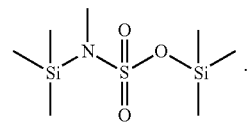

Compound 1 wherein the additive is included at about 0.5 parts by weight to about 5 parts by weight based on 100 parts by weight of the electrolyte, wherein the lithium salt is $LiPF_6$, and wherein the non-aqueous solvent comprises at least one selected from among dimethyl carbonate, diethyl carbonate, ethylmethyl carbonate, dipropyl carbonate, methylpropyl carbonate, ethyl propyl carbonate, ethylene carbonate, propylene carbonate, and butylene carbonate.

8. A lithium secondary battery comprising:

a cathode;

an anode; and the electrolyte of claim 7 between the cathode and the anode.

9. The lithium secondary battery of claim 8, wherein the cathode comprises a nickel-based cathode active material.

* * * * *

UNITED STATES PATENT AND TRADEMARK OFFICE
CERTIFICATE OF CORRECTION

PATENT NO. : 12,230,757 B2
APPLICATION NO. : 16/801893
DATED : February 18, 2025
INVENTOR(S) : Hyejin Park et al.

Page 1 of 1

It is certified that error appears in the above-identified patent and that said Letters Patent is hereby corrected as shown below:

In the Claims

In Column 18, Lines 60-66, in Claim 7, Compound 1, " 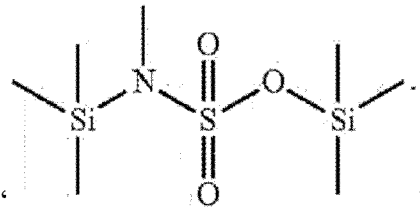 " and insert

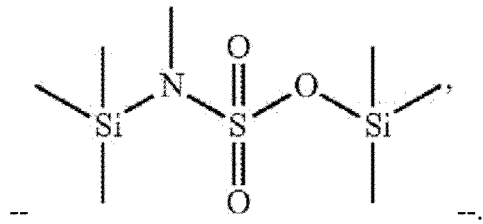

Signed and Sealed this
Eighth Day of July, 2025

Coke Morgan Stewart
*Acting Director of the United States Patent and Trademark Office*